United States Patent
Ishii et al.

(10) Patent No.: US 11,597,313 B2
(45) Date of Patent: Mar. 7, 2023

(54) VEHICULAR LIGHTING FIXTURE WITH LEVELING MECHANISM

(71) Applicant: STANLEY ELECTRIC CO., LTD., Tokyo (JP)

(72) Inventors: Yuki Ishii, Tokyo (JP); Kentaro Mori, Tokyo (JP); Yasuo Watanabe, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 17/518,322

(22) Filed: Nov. 3, 2021

(65) Prior Publication Data
US 2022/0134941 A1    May 5, 2022

(30) Foreign Application Priority Data
Nov. 4, 2020    (JP) .............................. JP2020-184112

(51) Int. Cl.
*B60Q 1/068*    (2006.01)
*B60Q 1/076*    (2006.01)

(52) U.S. Cl.
CPC ........... *B60Q 1/0683* (2013.01); *B60Q 1/076* (2013.01)

(58) Field of Classification Search
CPC ........ B60Q 1/0683; B60Q 1/076; B60Q 1/10; B60Q 1/105; B60Q 1/11; B60Q 1/115
See application file for complete search history.

(56) References Cited

U.S. PATENT DOCUMENTS

| | | | |
|---|---|---|---|
| 10,113,702 B2 * | 10/2018 | Shibata | F21S 41/00 |
| 2007/0127254 A1 * | 6/2007 | Chen | B60Q 1/0683 |
| | | | 362/512 |
| 2011/0044063 A1 * | 2/2011 | Yamamoto | B60Q 1/076 |
| | | | 362/428 |

(Continued)

FOREIGN PATENT DOCUMENTS

| | | | |
|---|---|---|---|
| DE | 103 32 976 A1 | 4/2005 | |
| EP | 0588715 B1 * | 3/1994 | ............ B60Q 1/076 |

(Continued)

OTHER PUBLICATIONS

Ravier et al., Headlamp with correction unit and reset device, 1994, EP0588715B1, Google Patents https://patents.google.com/patent/EP0588715B1/en?oq=ep0588715 (Year: 1994).*

(Continued)

*Primary Examiner* — Oluseye Iwarere
*Assistant Examiner* — Michael Chiang
(74) *Attorney, Agent, or Firm* — Kenealy Vaidya LLP

(57) ABSTRACT

A vehicular lighting fixture is provided which includes a combination of an aiming mechanism and a leveling mechanism that can reduce deformation of an aiming/leveling bracket. A vertical aiming mechanism and a leveling mechanism include an aiming/leveling bracket that is integrally molded with a resin. A rectangular recess is formed in the aiming/leveling bracket so as to accommodate an aiming nut serving as a point of load for the vertical aiming and an actuator output shaft serving as a point of effort. The rectangular recess is located on or near the central axis of the aiming nut where the central axis substantially coincides with the front-rear direction of a vehicle.

20 Claims, 6 Drawing Sheets

(56) References Cited

U.S. PATENT DOCUMENTS

| | | | |
|---|---|---|---|
| 2014/0112011 A1* | 4/2014 | Nomura | B60Q 1/0683 362/460 |
| 2019/0092219 A1 | 3/2019 | Tajima | |
| 2019/0092220 A1* | 3/2019 | Aizawa | B60Q 1/0683 |

FOREIGN PATENT DOCUMENTS

| | | |
|---|---|---|
| EP | 0 588 715 B1 | 4/1997 |
| EP | 3 069 931 A2 | 9/2016 |
| JP | 2019-61810 A | 4/2019 |

OTHER PUBLICATIONS

The extended European Search Report for the related European Patent Application No. 21206079.2 dated Apr. 5, 2022.

* cited by examiner

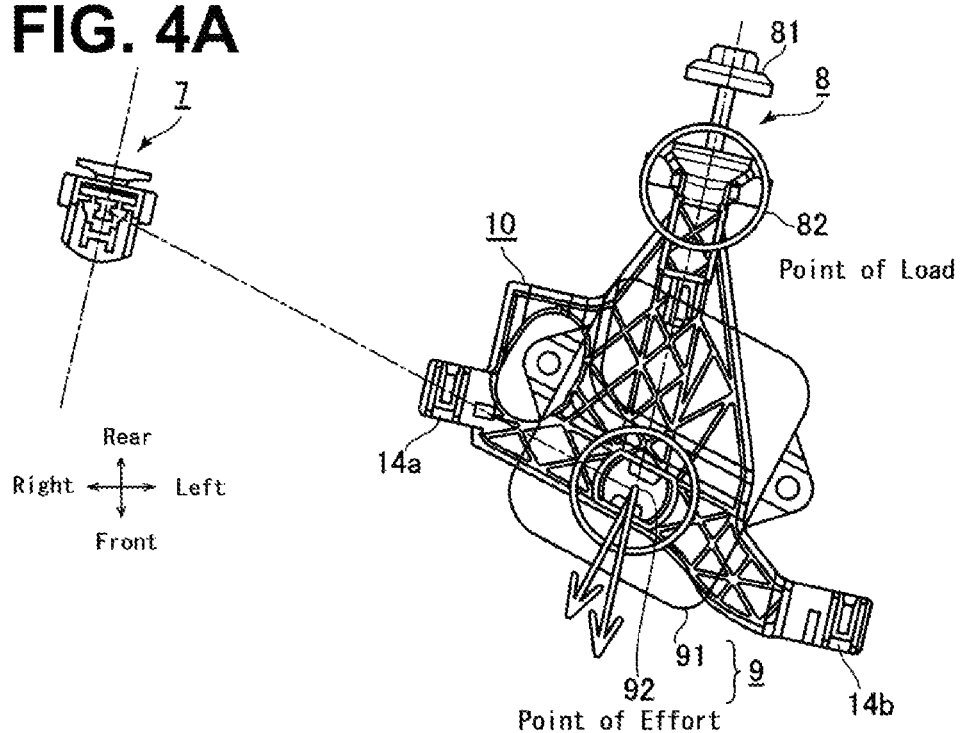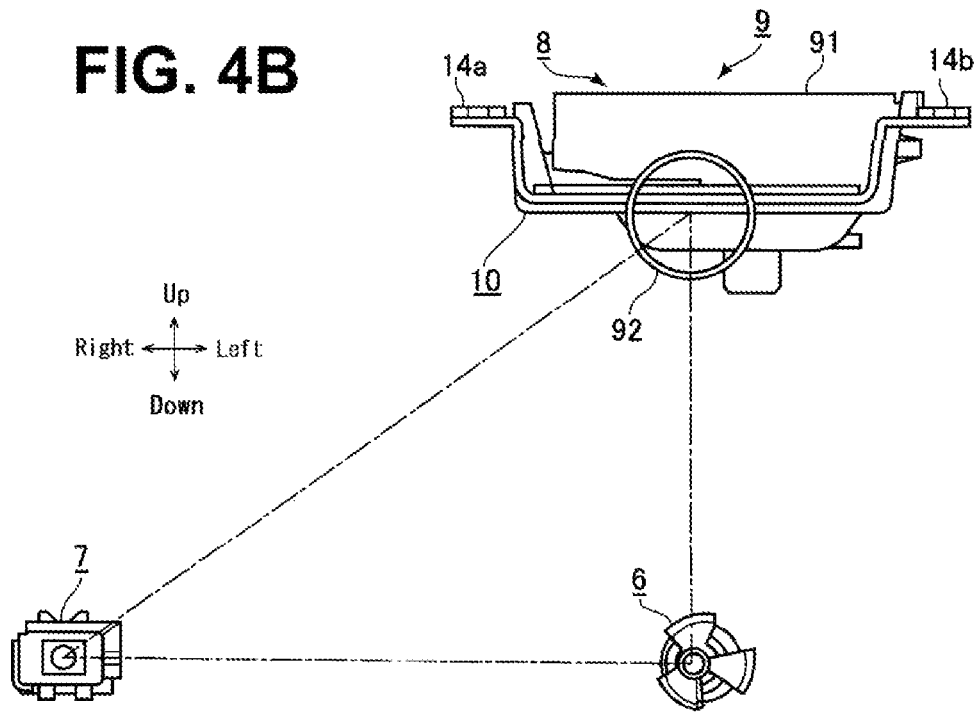

VEHICULAR LIGHTING FIXTURE WITH LEVELING MECHANISM

This application claims the priority benefit under 35 U.S.C. § 119 of Japanese Patent Application No. 2020-184112 filed on Nov. 4, 2020, which is hereby incorporated in its entirety by reference.

TECHNICAL FIELD

The presently disclosed subject matter relates to a vehicular lighting fixture which acts in combination with an aiming mechanism and a leveling mechanism.

BACKGROUND ART

In general, vehicular lighting fixtures can include a vertical aiming mechanism and a horizontal aiming mechanism configured to adjust the optical axis of a lamp unit in the vertical and horizontal directions within certain ranges in order to irradiate light with a desired distribution pattern on the road surface. Furthermore, there have been known vehicular lighting fixtures with a leveling mechanism used in addition to a vertical aiming mechanism. Here, the aiming mechanisms are intended to initially adjust the optical axis of a lamp unit at the time of vehicle assembly or vehicle inspection, while the leveling mechanism is intended to adjust the optical axis of the lamp unit using a built-in motor in accordance with the weight or the like of the vehicle or in response to operation methods.

FIG. 1 is a diagram illustrating a conventional vehicular lighting fixture, in part, with a vertical aiming mechanism and a leveling mechanism in combination (see Patent Literature 1, Japanese Patent Application Laid-Open No. 2019-061810 or US 2019/092219A1 corresponding thereto). The vehicular lighting fixture illustrated in FIG. 1 is, for example, a right low beam headlamp.

In FIG. 1, reference number 100 denotes a housing, 200 a leveling mechanism, and 300 a bracket for use in both aiming and leveling (aiming/leveling bracket). The aiming/leveling bracket 300 is composed of a cross plate-like member and is integrally injection molded from a resin. The leveling mechanism 200 can be composed of a leveling actuator 201 and an actuator output shaft 202. The leveling actuator 201 is fixed to a light body bracket (not illustrated). The actuator output shaft 202 protrudes from the leveling actuator 201 and is movable. Furthermore, the cross plate-like member of the aiming/leveling bracket 300 includes first and third end portions at opposite sides in a first direction (in FIG. 1, a rear-front direction) and second and fourth end portions at opposite sides in a second direction orthogonal to the first direction (in FIG. 1, a left-right direction). Included in the aiming/leveling bracket 300 are: an aiming bolt 301 rotatable and which penetrates the housing 100 and located at the first end portion; an aiming nut 302 for the vertical aiming mechanism, configured to be screwed onto the aiming bolt 301; a rectangular recess 303 and a stepped lowering portion 304 configured to accommodate the actuator output shaft 202 at the second end portion; an elastic piece 305, disposed at the third end portion opposite to the first end portion, configured to elastically press the aiming nut 302 in the second direction (left-right direction); and a stopper 306 disposed at the fourth end portion opposite to the second end portion. The actuator output shaft 202 is offset in the second direction from a central axis Ax along which the aiming nut 302 rotates, thereby improving the degree of freedom in the arrangement of the leveling mechanism 200.

However, within the aiming/leveling bracket 300 of the above-mentioned conventional vehicular lighting fixture illustrated in FIG. 1, the aiming nut 302 that serves as a fulcrum and the rectangular recess 303, where the actuator output shaft 202 is accommodated, that serves as a point of effort are spaced apart from each other in the left-right direction. That is, the fulcrum and the point of effort are not located on the same axis but are separated by a certain distance. As a result, when a force is applied to the rectangular concave portion 303, where the actuator output shaft 202 is accommodated, in the front direction and the rear direction, it is inferred that a rotational moment is generated in the rectangular concave portion 303 (point of effort), where the actuator output shaft 202 is accommodated, with respect to the central axis Ax of the aiming nut 302 (fulcrum), and the amount of displacement of the rectangular concave portion 303 of the aiming/leveling bracket 300 increases, thereby being likely to deform the aiming/leveling bracket 300. As a result of the aiming/leveling bracket 300 being deformed, a problem may arise where 100% of the force of the actuator output shaft 202 cannot be transmitted to the lamp body bracket (not illustrated). In order to suppress this deformation, the elastic piece 305 is provided, however, the force applied to the elastic piece 305 becomes large. Thus, in this conventional vehicular lighting fixture, the main part of the elastic piece 305 is made of a metal, and the left side portion of the elastic piece 305 is made of a resin as an abutment portion (sliding portion) with the housing 100 (see FIG. 9 of Patent Literature 1). As a result, although the deformation of the aiming/leveling bracket 300 can be reduced, the elastic piece 305, which is made of a metal, cannot be integrally formed with the aiming/leveling bracket 300 resulting in the increase of production costs.

SUMMARY

The presently disclosed subject matter was devised in view of these and other problems and features in association with the conventional art. According to an aspect of the presently disclosed subject matter, a vehicular lighting fixture according to the present invention includes: a housing; a lamp unit, accommodated in the housing and configured to emit light in a front direction; an aiming mechanism, accommodated in the housing and configured to enable aim of the lamp unit in a vertical direction or a horizontal direction of a vehicle when the vehicular lighting fixture is mounted on the vehicle; and a leveling mechanism, accommodated in the housing and configured to level the lamp unit in the vertical direction or the horizontal direction of the vehicle independently of the aiming mechanism, wherein the lamp unit is supported by the aiming mechanism and the leveling mechanism. In this vehicular lighting fixture, the aiming mechanism includes an aiming bolt and an aiming nut configured to be screwed onto the aiming bolt; the leveling mechanism includes a leveling actuator and an actuator output shaft protruding from the leveling actuator and which is movable by the leveling actuator; the aiming mechanism and the leveling mechanism include a shared aiming/leveling bracket integrally molded with a resin; the aiming nut is formed in the aiming/leveling bracket; and a recess configured to accommodate the actuator output shaft is located on or near a central axis of the aiming nut of the aiming/leveling bracket.

In the vehicular lighting fixture with the foregoing aspect, the aiming/leveling bracket can be formed in a spreading shape toward the recess from the aiming nut.

In the vehicular lighting fixture with the foregoing aspect, the aiming/leveling bracket can include an elastic piece that is disposed near the aiming nut and on a central axis of the aiming nut.

In the vehicular lighting fixture with the foregoing aspect, the recess can be located at or substantially at a front end portion of the aiming/leveling bracket, and the aiming nut can be located at or substantially at a rear end portion of the aiming/leveling bracket.

In the vehicular lighting fixture with the foregoing aspect, the leveling mechanism can be a vertical leveling mechanism is disposed above the lamp unit, and the aiming/leveling bracket can be disposed between the leveling actuator and the lamp unit.

In the vehicular lighting fixture with the foregoing aspect, the aiming/leveling bracket can include left and right built-in spring slit structures which are disposed on left and right sides of the recess and via which the aiming/leveling bracket is secured to the housing.

Advantageous Effect of Invention

According to the presently disclosed subject matter, since the rotational moment at the actuator output shaft with respect to the central axis of the aiming nut is reduced, it is possible to reduce the amount of displacement of the aiming/leveling bracket. Furthermore, the whole of the elastic piece for suppressing the amount of displacement, which has been reduced, can be made of a resin, and therefore, the elastic piece can be integrated with the aiming/leveling bracket, thereby reducing production costs.

BRIEF DESCRIPTION OF DRAWINGS

These and other characteristics, features, and advantages of the presently disclosed subject matter will become clear from the following description with reference to the accompanying drawings, wherein:

FIG. 4A is an extracted detailed top view of the vehicular lighting fixture of FIGS. 2A and 2B, and FIG. 4B is a front view of the extracted part;

DESCRIPTION OF EXEMPLARY EMBODIMENTS

A description will now be made below to a vehicular lighting fixture of the presently disclosed subject matter with reference to the accompanying drawings in accordance with exemplary embodiments.

Figure 1:
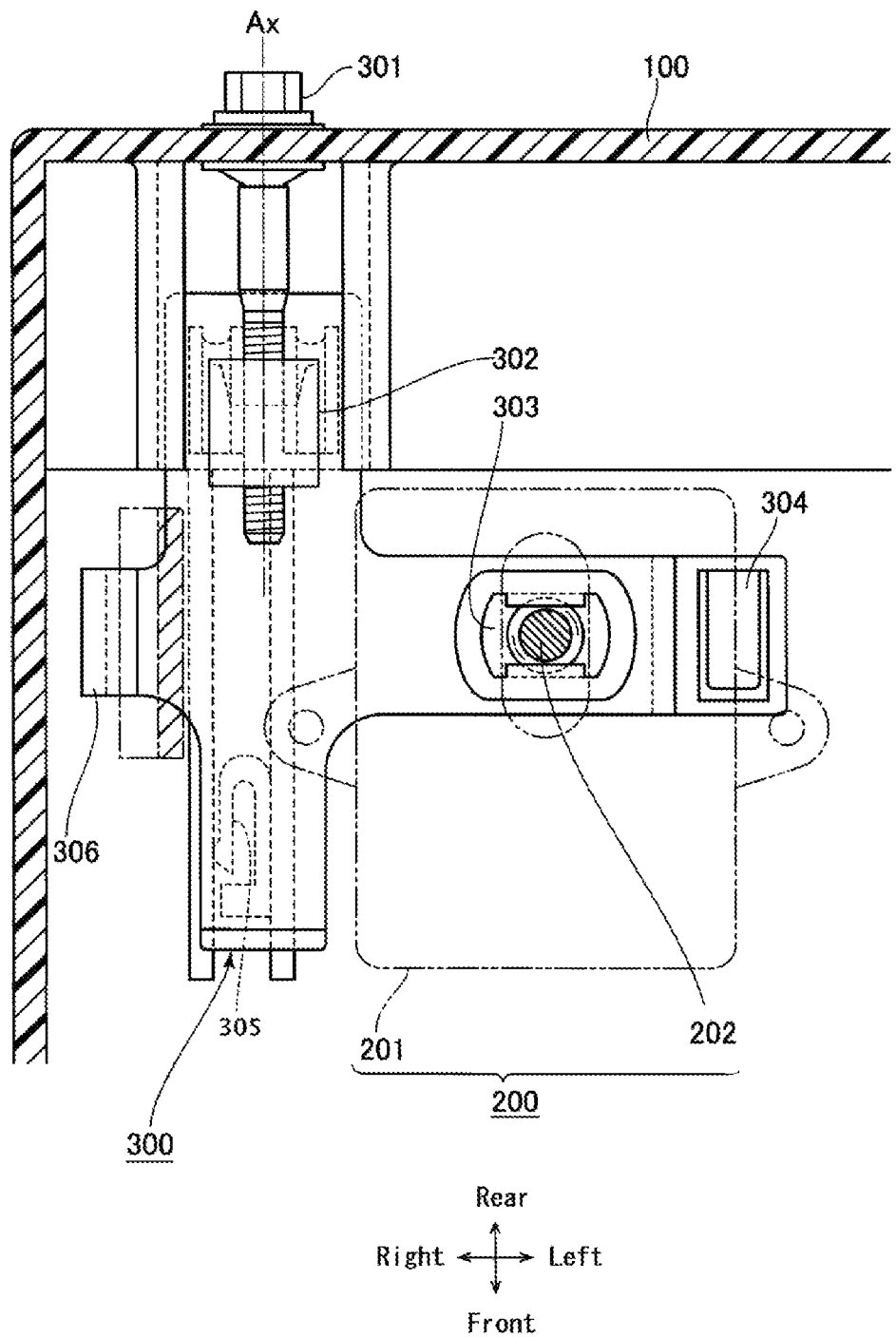
FIG. 1 is a diagram illustrating a conventional vehicular lighting fixture which uses a vertical aiming mechanism and a leveling mechanism in combination.
Figure 2A:
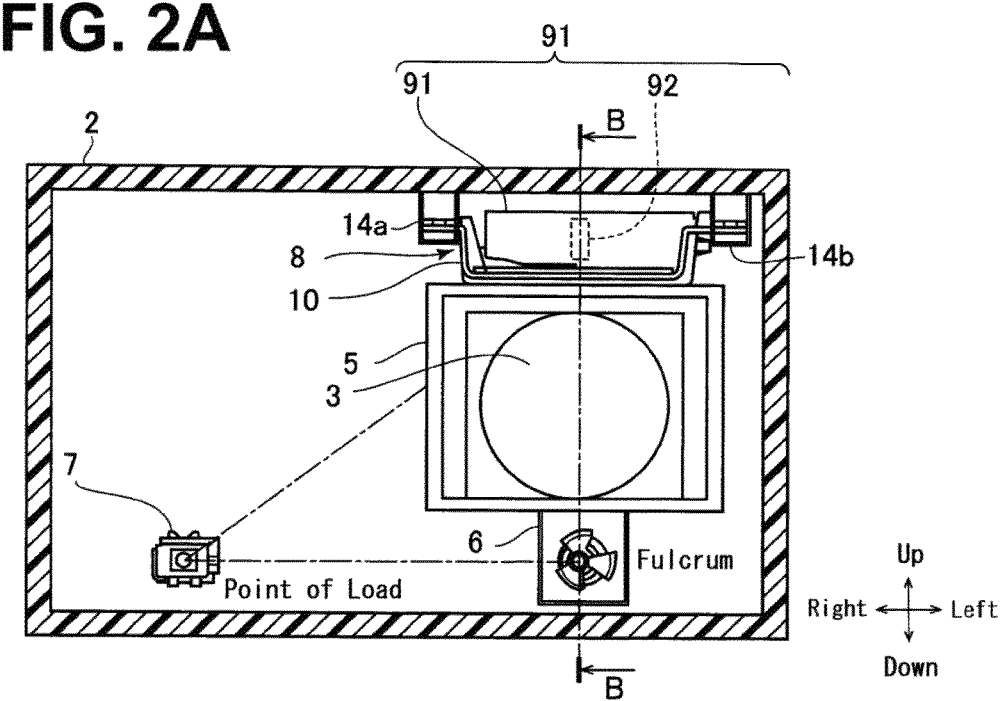
FIG. 2A is a front view illustrating a vehicular lighting fixture made in accordance with principles of the presently disclosed subject matter.
Figure 2B:
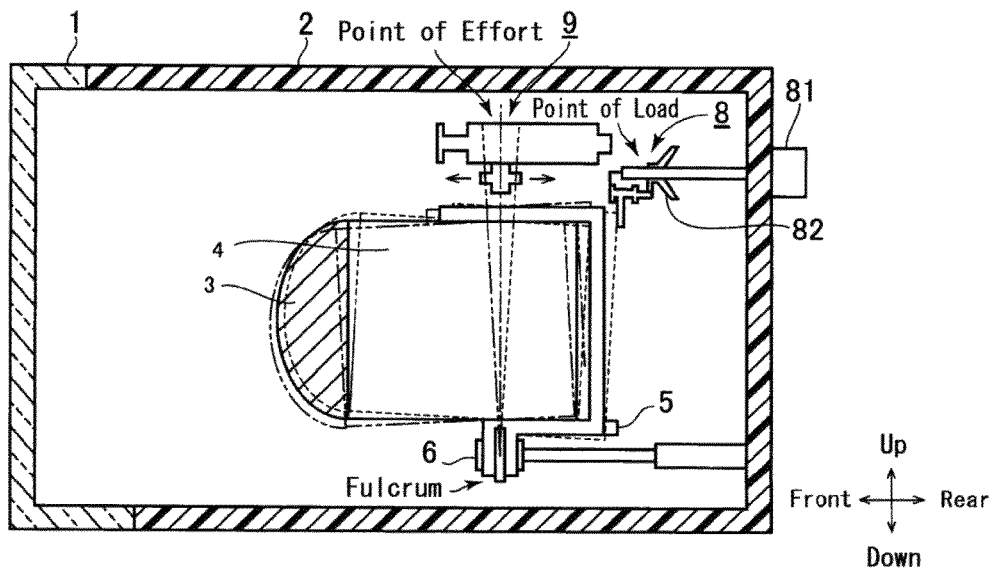
FIG. 2B is a cross-sectional view taken along line B-B in FIG. 2A.

FIG. 2A is a front view illustrating a vehicular lighting fixture made in accordance with the principles of the presently disclosed subject matter, and FIG. 2B is a cross-sectional view taken along line B-B in FIG. 2A. The vehicular lighting fixture illustrated in FIGS. 2A and 2B is, for example, a low beam headlamp provided to the front left part of a vehicular body. Note that directions used herein are defined on the basis of a situation where the vehicular lighting fixture is mounted on a vehicle body as a headlamp, so the horizontal (right-left) direction, vertical (up-down) direction, and longitudinal (front-rear) direction are relative to the vehicle body as indicated in the drawings.

In FIGS. 2A and 2B, the vehicular lighting fixture includes a housing 2 equipped with an outer lens 1, and a lamp unit 4 which is configured to emit light and include an inner lens 3 and which is accommodated in the housing 2. The vehicular lighting fixture includes a lamp bracket 5 that supports the lamp unit 4, and a fulcrum aiming mechanism 6, a horizontal aiming mechanism 7 and a vertical aiming mechanism 8, through which the lamp bracket 5 is fixed to the housing 2. Furthermore, a leveling mechanism 9 combined with the vertical aiming mechanism 8 is provided.

The lower end of the lamp bracket 5 is pivotally fixed to the fulcrum aiming mechanism 6. The horizontal aiming mechanism 7 is fixed to a right end portion of the lamp bracket 5 using an aiming bolt and aiming nut (not shown). This configuration can allow the adjustment of the position of the lamp bracket 5, i.e., the optical axis of the lamp unit 4 to the left and right with respect to the aiming fulcrum of the fulcrum aiming mechanism 6. The vertical aiming mechanism 8 is fixed to an upper end portion of the lamp bracket 5, so as to allow adjustment of the position of the lamp bracket 5 or the optical axis of the lamp unit 4 vertically with respect to the aiming fulcrum of the fulcrum aiming mechanism 6. The leveling mechanism 9 includes: a leveling actuator 91 with a built-in motor; and an actuator output shaft 92 which protrudes from a lower surface 91a of the leveling actuator 91 (refer to FIGS. 3A and 3B) downward toward the lamp unit 4 and the lamp bracket 5 and which is movable within a movable region 91b (see FIGS. 3A and 3B) in the front-rear direction of the leveling actuator 91. Further included is a bracket 10 common to the aiming mechanism 8 and leveling mechanism 9 (herein defined as an aiming/leveling bracket 10), which is a member obtained by integrally injection molding a resin. The aiming/leveling bracket 10 includes a rectangular recess 11 (see FIG. 5A) configured to accommodate the aiming nut 82 of the vertical aiming mechanism 8 and the actuator output shaft 92 of the leveling mechanism 9. The aiming/leveling bracket 10 is connected to the lamp bracket 5 to allow the optical axis of the lamp unit 4 to be variable.

First, the vertical aiming operation will be described with reference to FIG. 2B. When the aiming nut 82 of the vertical aiming mechanism 8 is rotated as a point of load, vertical aiming is achieved by vertical movement of the fulcrum aiming mechanism 6 with respect to the aiming fulcrum, while the actuator output shaft 92 of the leveling mechanism 9 serves as a point of effort.

Figure 3A:
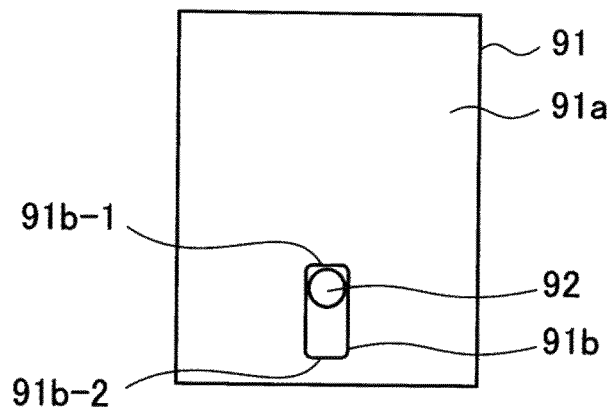
FIGS. 3A and 3B are each a bottom view of a leveling mechanism illustrating the relationship between a leveling actuator and an actuator output shaft of FIGS. 2A and 2B.
Figure 3B:
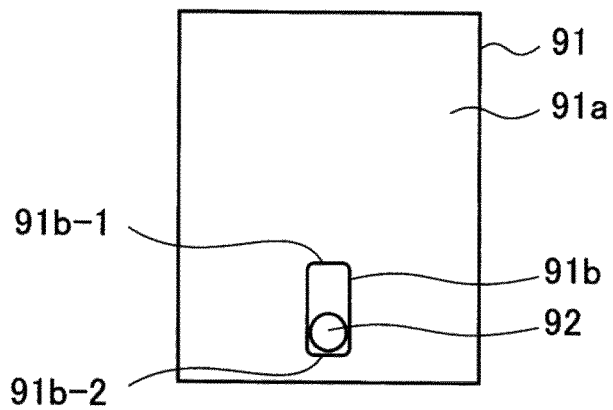

Next, the vertical leveling operation will be described with reference also to FIGS. 3A and 3B illustrating the relationship between the leveling actuator 91 and the actuator output shaft 92 in FIGS. 2A and 2B, and thus, the leveling mechanism 9 can serve as a vertical leveling mechanism. It should be noted that the vertical leveling operation is performed by a not-illustrated control unit which, by receiving an output signal from the not-illustrated sensor configured to detect the weight or the like of the vehicle, is caused to generate a vertical leveling signal for driving the built-in motor of the leveling actuator 91.

In FIGS. 2A, 2B, 3A, and 3B, the actuator output shaft 92 is movable in the longitudinal (front-rear) direction of the vehicle. In the lightweight state of the vehicle when no person or load is mounted on the vehicle, as illustrated in FIG. 3A, the actuator output shaft 92 is moved to a rear end 91*b*-1 side, in order to generate a force to act on the lamp bracket 5. As a result, the lamp unit 4 is raised while the fulcrum aiming mechanism 6 serves as the fulcrum, thereby directing the optical axis upward. On the other hand, in the vehicle heavy state in which a person or load is mounted on the vehicle, as illustrated in FIG. 3B, the actuator output shaft 92 is moved to a front end 91*b*-2 side, in order to generate a force to act on the lamp bracket 5. As a result, the lamp unit 4 is lowered while the fulcrum aiming mechanism 6 serves as the fulcrum, thereby directing the optical axis downward.

FIGS. 3A and 3B illustrate a case where the aiming/leveling bracket 10 is made smaller. Specifically, as in FIGS. 3A and 3B, it is preferable that the actuator output shaft 92 be directed downward and that the leveling mechanism 9 and the aiming/leveling bracket 10 be disposed above the lamp unit 4 and the lamp bracket 5.

As a modified example, there is a configuration where the leveling mechanism 9 and the aiming/leveling bracket 10 are disposed below the lamp unit 4 and the lamp bracket 5. In this case, it is necessary to position the actuator output shaft 92 on the front end side of the movable region and raise the optical axis of the lamp unit 4 in the lightweight state of the vehicle where no person or load is mounted on the vehicle, and it is necessary to position the actuator output shaft 92 on the rear end side of the movable region and lower the optical axis of the lamp unit 4 in the vehicle heavy state in which a person or load is mounted on the vehicle. As a result, since it is necessary to position the aiming nut 82 at a position rearward by the movable region 91*b* of the actuator output shaft 92, the length of the aiming/leveling bracket 10 in the modified example in the longitudinal (front-rear) direction needs to be made greater than that in the case of FIGS. 2A to 3B.

In the modified example, it should be noted that the fulcrum aiming mechanism 6 and the horizontal aiming mechanism 7 are disposed above the lamp unit 4 according to the change in the positions of the leveling mechanism 9 and the aiming/leveling bracket 10.

Thus, as illustrated in FIGS. 2A to 3B, the leveling mechanism 9 disposed above the lamp unit 4 can shorten the length of the aiming/leveling bracket 10 in the longitudinal (front-rear) direction, resulting in the shortening of the leveling mechanism 9.

FIG. 4A is an extracted detailed top view of the vehicular lighting fixture of FIGS. 2A and 2B, and FIG. 4B is a front view of the extracted part.

In FIGS. 4A and 4B, the aiming nut 82 serving as a point of load during vertical aiming and the actuator output shaft 92 serving as a point of effort during leveling are located on a central axis Ax of the aiming nut 82 in the horizontal and vertical directions. As a result, when the actuator output shaft 92 is moved back and forth as shown by the arrow, the rotational moment about the central axis Ax, including the point of load during vertical aiming, can be reduced. Incidentally, although the central axis Ax substantially coincides with the longitudinal direction (front-rear) direction of the vehicle, the central axis Ax is slightly inclined with respect to the longitudinal direction of the vehicle in this exemplary embodiment.

Figure 5A:
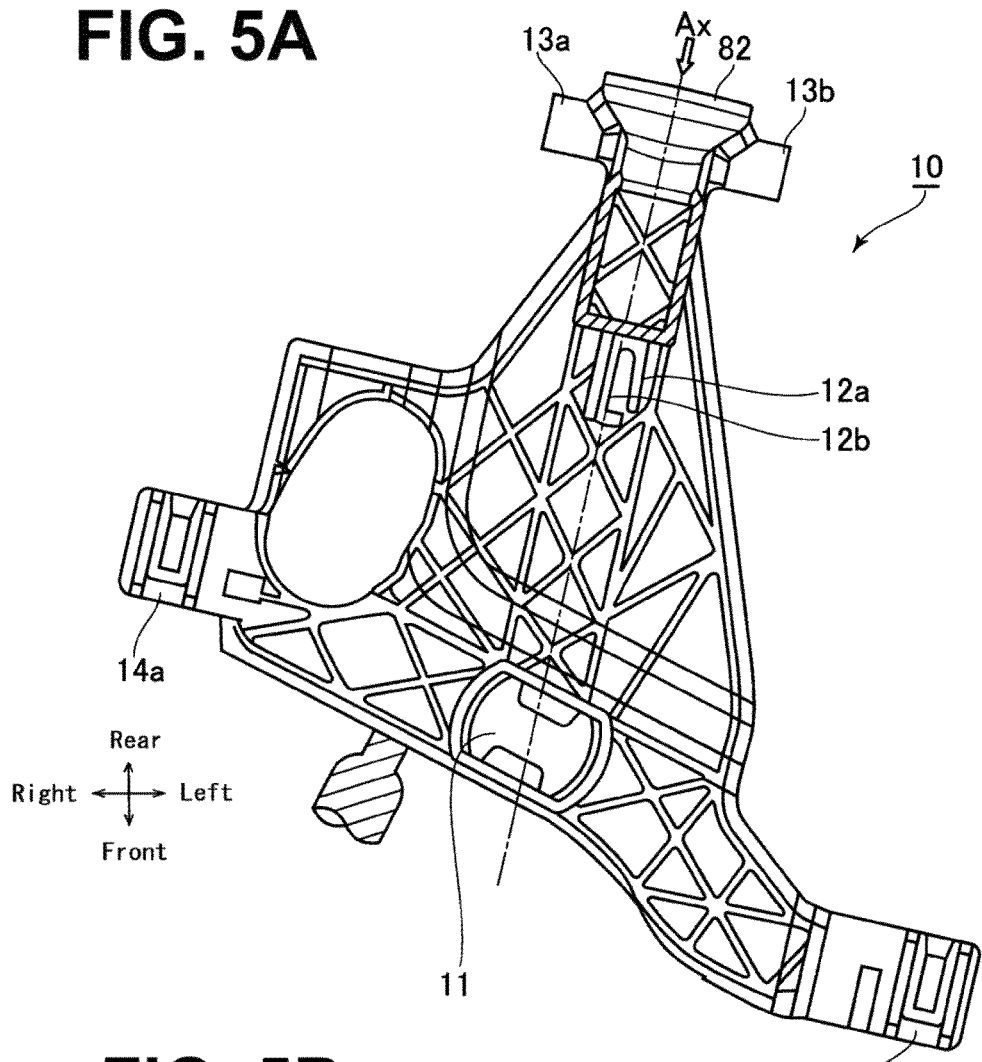
FIG. 5A is an overall plan view illustrating details of an aiming/leveling bracket in FIGS. 2A and 2B with partial cross-sectional portions.
Figure 5B:
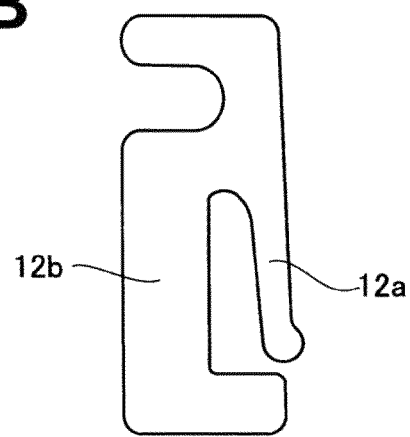
FIG. 5B is an enlarged view of an elastic piece.

FIG. 5A is an overall plan view illustrating a detail of an aiming/leveling bracket 10 in FIGS. 2A and 2B with partial cross-sectional portions, and FIG. 5B is an enlarged view of an elastic piece.

As shown in FIG. 5A, the actuator output shaft 92 serving as a point of effort and the rectangular recess 11, configured to accommodate the aiming nut 82 serving as a point of load during vertical aiming, are disposed on the central axis Ax of the aiming nut 82, which is almost along the longitudinal (front-rear) direction of the vehicle. Thus, it is possible to reduce the amount of displacement of the rectangular recess 11 where the actuator output shaft 92 is accommodated.

The aiming nut 82 is located at the rear end portion of the aiming/leveling bracket 10, and the rectangular recess 11 is located at the front end portion of the aiming/leveling bracket 10. This is because it is necessary to ensure a space for placing the leveling actuator 91 as well as to ensure a length corresponding to the movable region 91*b* for the actuator output shaft 92 to move back and forth when the vertical leveling signal is transmitted to the leveling actuator 91. Since it is sufficient to ensure the space and the length for the movable region 91*b*, the positions of the aiming nut 82 and the rectangular recess 11 may or may not be the end portions of the aiming/leveling bracket 10. That is, the aiming nut 82 may be provided near the rear end rather than just at the rear end of the aiming/leveling bracket 10, and the rectangular recess 11 may be provided near the front end rather than just at the front end of the aiming/leveling bracket 10.

Referring to FIG. 5B, the elastic piece 12*a* is disposed in the vicinity of the aiming nut 82 on the rectangular recess 11 side and is formed on one side, for example, on the right side along the central axis Ax. That is, when the aiming/leveling bracket 10 is pulled in by the aiming bolt 81, the elastic piece 12*a* and an abutment portion (sliding portion) 12*b* on the opposite side of the elastic piece 12*a* are pinched to the housing 2 side, whereby rotation and deformation of the aiming/leveling bracket 10 due to the rotational force of the aiming bolt 81 can be suppressed. Furthermore, since the elastic piece 12*a* is disposed on the right side to lower the resistance of the abutting portion (sliding portion) 12*b*, it is possible to suppress the deformation of the aiming/leveling bracket 10 including the aiming nut 82. In addition, the amount of displacement of the rectangular recess 11, where the actuator output shaft 92 is accommodated, is reduced, which enables the reduction of the force applied to the elastic piece 12*a* accordingly. This enables the elastic piece 12*a* to be produced from a resin, and thus, the elastic piece 12*a* can be integrally molded with the aiming/leveling bracket 10, thereby reducing production costs.

Furthermore, in the presently disclosed subject matter, the aiming/leveling bracket 10 can be formed in a spreading shape toward the rectangular recess 11 from the aiming nut 82. Thus, since the aiming/leveling bracket 10 is reinforced, the amount of displacement of the aiming/leveling bracket 10 can be reduced further.

Furthermore, rotation preventing portions 13*a* and 13*b* extending to the left and right can be formed beside the aiming nut 82 to prevent the rotation of the entire aiming/leveling bracket 10 during manual rotation of the aiming bolt 81.

Furthermore, built-in spring slit structures 14*a* and 14*b*, via which the aiming/leveling bracket 10 is secured to the housing 2, can be disposed on the left and right sides of the rectangular recess 11 along with the rectangular recess 11 on the front side of the aiming/leveling bracket 10. The built-in spring slit structures 14*a* and 14*b* set the depth of a concave portion of the aiming/leveling bracket 10 and the vibration allowance range in the vertical direction with the housing 2 so that the lamp unit 4 does not receive the force caused by the vibration of the housing 2 or the like in the vertical direction (see FIG. 2A). This configuration can prevent any load in the vertical direction from being applied to the lamp unit 4.

Figure 6:
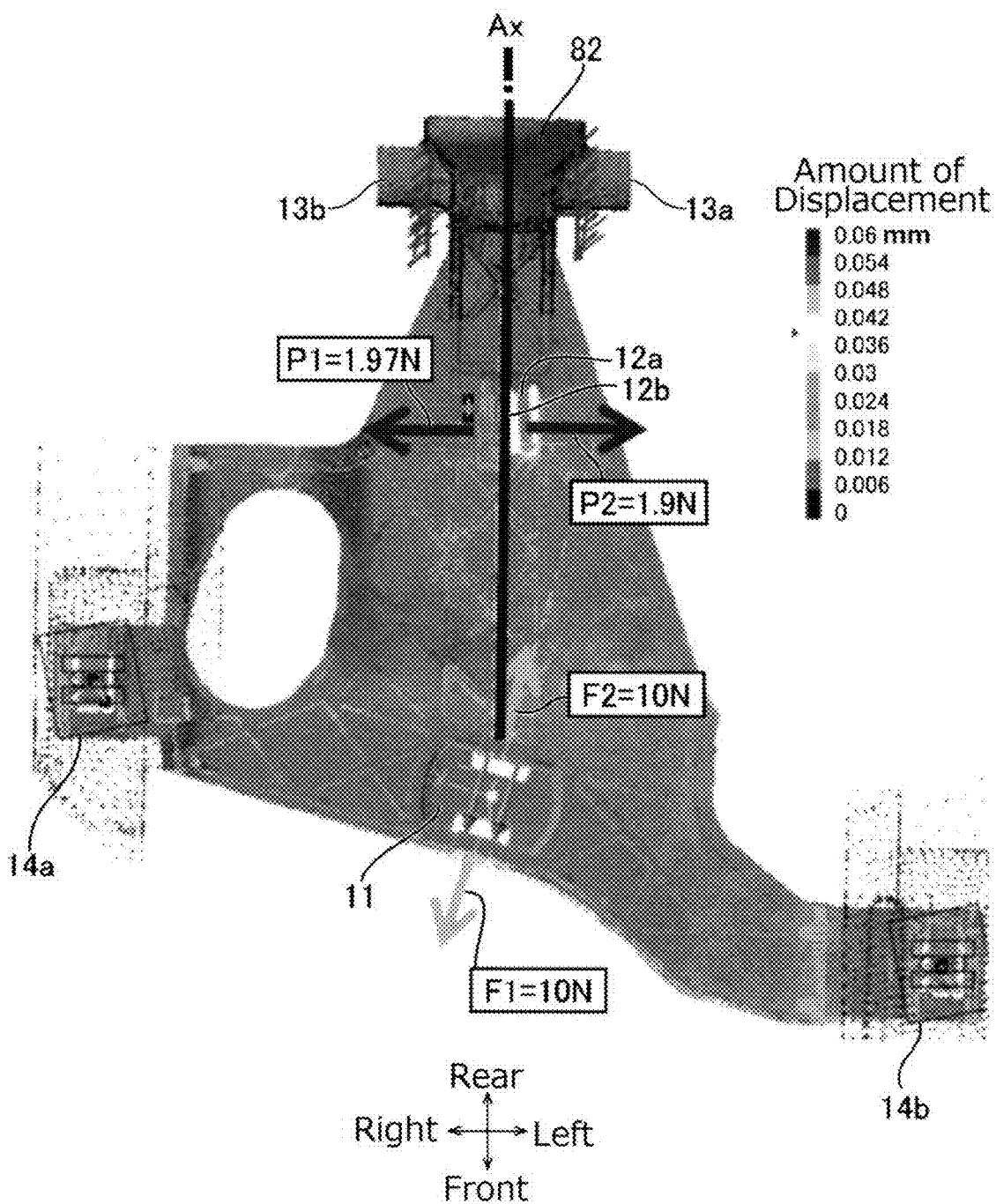
FIG. 6 is a diagram showing displacement amount simulation results of the aiming/leveling bracket of FIGS. 5A and 5B.

FIG. 6 is a diagram showing displacement amount simulation results of the aiming/leveling bracket 10 of FIGS. 5A and 5B.

As shown in FIG. 6, the aiming nut 82 serving as a fulcrum and the rectangular recess 11, where the actuator output shaft 92 is accommodated, which serves as a point of effort, are offset with an offset amount of substantially zero in the left-right direction with respect to the central axis Ax. That is, the fulcrum and the point of effort are on the same axis. As a result of the displacement amount simulation, when the forward force F1 of 10 N and the rear force F2 of 10 N are applied to the rectangular recess 11, where the actuator output shaft 92 is accommodated, the rotational moment is hardly generated in the rectangular recess 11, where the actuator output shaft 92 is accommodated, (point of effort) with respect to the central axis Ax of the aiming nut 82 (fulcrum). Furthermore, the displacement position of the rectangular recess 11 of the aiming/leveling bracket 10 is as small as about 0.03 mm, resulting in almost no deformation of the actuator output shaft 92 occurring. Forces P1 and P2 applied to the sliding portion 12b and the elastic piece 12a at this time are 1.97 N and 1.90 N, respectively, which are very small. Therefore, the elastic piece 12a can be made of a resin, and be integrated with the aiming/leveling bracket 10, thereby reducing production costs.

In the exemplary embodiment described above, the shape of the rectangular recess 11 does not have to be a rectangle, and the corner of the rectangle may be chamfered. Furthermore, the shape of the rectangular recess 11 may be an ellipse, or may be a circle. If the shape thereof is circular, it is better to provide a gap for the actuator output shaft 92 so as not to be in contact with the end surface of the recess.

Furthermore, in the above-mentioned exemplary embodiment, the rectangular recess 11 is located on the central axis Ax of the aiming nut 82, but it is not necessary for the center of the rectangular recess 11 to coincide with the central axis Ax as long as the central axis Ax passes within the range of the rectangular recess 11. Furthermore, although the amount of displacement of the aiming/leveling bracket 10 is slightly increased, it is sufficient to place the rectangular recess 11 on and in the vicinity of the central axis Ax of the aiming nut, so that the amount of displacement can be reduced more than with the conventional lighting fixtures.

Furthermore, in the above-described exemplary embodiment, the vertical aiming mechanism and the leveling mechanism are combined with each other, but the horizontal aiming mechanism and the leveling mechanism can be combined with each other as well. In this case, the left-right leveling operation of the left-right leveling mechanism is activated upon reception of a signal, e.g., a steering signal from a predetermined operating means of the vehicle (such as a handle angle sensor), to drive a built-in motor of the leveling actuator. This configuration can be adopted for, for example, an adaptive front-light system (AFS) control.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

REFERENCE SIGNS LIST 1 outer lens
2 housing
3 inner lens
4 lamp unit
5 lamp bracket
6 fulcrum aiming mechanism
7 horizontal aiming mechanism
8 vertical aiming mechanism
81 aiming bolt
82 aiming nut
9 leveling mechanism
91 leveling actuator
91a lower surface
91b movable region of actuator output shaft
91b-1 rear end
91b-2 front end
92 actuator output shaft
10 bracket for use in both aiming and leveling (aiming/leveling bracket)
11 rectangular recess
12a elastic piece
12b abutment portion (sliding portion)
13a, 13b rotation preventing portion
14a, 14b built-in spring slit structure
100 housing
200 leveling mechanism
201 leveling actuator
202 actuator output shaft
300 bracket for use in both aiming and leveling (aiming/leveling bracket)
301 aiming bolt
302 aiming nut
303 rectangular recess
304 stepped lowering portion
305 elastic piece
306 stopper
Ax central axis

What is claimed is:

1. A vehicular lighting fixture comprising:
a housing;
a lamp unit, accommodated in the housing and configured to emit light in a front direction;
an aiming mechanism, accommodated in the housing and configured to enable aim of the lamp unit in a vertical direction or a horizontal direction of a vehicle when the vehicular lighting fixture is mounted on the vehicle; and
a leveling mechanism, accommodated in the housing and configured to level the lamp unit in the vertical direction or the horizontal direction of the vehicle independently of the aiming mechanism, wherein the lamp unit is supported by the aiming mechanism and the leveling mechanism, and wherein:
the aiming mechanism includes an aiming bolt and an aiming nut configured to be screwed onto the aiming bolt;
the leveling mechanism includes a leveling actuator and an actuator output shaft protruding from the leveling actuator and which is movable by the leveling actuator;

the aiming mechanism and the leveling mechanism include a shared aiming/leveling bracket integrally molded with a resin;

the aiming nut is formed in the aiming/leveling bracket;

a recess configured to accommodate the actuator output shaft is located on or near a central axis of the aiming nut of the aiming/leveling bracket; and the aiming/leveling bracket includes left and right built-in spring slit structures which are disposed on left and right sides of the recess and via which the aiming/leveling bracket is secured to the housing.

2. The vehicular lighting fixture according to claim 1, wherein the aiming/leveling bracket is formed in a spreading shape toward the recess from the aiming nut.

3. The vehicular lighting fixture according to claim 2, wherein:

the recess is located at or substantially at a front end portion of the aiming/leveling bracket; and the aiming nut is located at or substantially at a rear end portion of the aiming/leveling bracket.

4. The vehicular lighting fixture according to claim 3, wherein:

the leveling mechanism is a vertical leveling mechanism is disposed above the lamp unit; and the aiming/leveling bracket is disposed between the leveling actuator and the lamp unit.

5. The vehicular lighting fixture according to claim 2, wherein:

the leveling mechanism is a vertical leveling mechanism is disposed above the lamp unit; and the aiming/leveling bracket is disposed between the leveling actuator and the lamp unit.

6. The vehicular lighting fixture according to claim 2, wherein the recess has a shape of one selected from the group consisting of a rectangle, a chamfered rectangle, an ellipse and a circle.

7. The vehicular lighting fixture according to claim 2, comprising rotation preventing portions formed beside the aiming nut and extending laterally to prevent rotation of the entire aiming/leveling bracket during manual rotation of the aiming nut.

8. The vehicular lighting fixture according to claim 1, wherein the aiming/leveling bracket comprises an elastic piece that is disposed near the aiming nut and on a central axis of the aiming nut.

9. The vehicular lighting fixture according to claim 8, wherein:

the recess is located at or substantially at a front end portion of the aiming/leveling bracket; and the aiming nut is located at or substantially at a rear end portion of the aiming/leveling bracket.

10. The vehicular lighting fixture according to claim 9, wherein:

the leveling mechanism is a vertical leveling mechanism is disposed above the lamp unit; and the aiming/leveling bracket is disposed between the leveling actuator and the lamp unit.

11. The vehicular lighting fixture according to claim 8, wherein:

the leveling mechanism is a vertical leveling mechanism is disposed above the lamp unit; and the aiming/leveling bracket is disposed between the leveling actuator and the lamp unit.

12. The vehicular lighting fixture according to claim 8, wherein the recess has a shape of one selected from the group consisting of a rectangle, a chamfered rectangle, an ellipse and a circle.

13. The vehicular lighting fixture according to claim 8, comprising rotation preventing portions formed beside the aiming nut and extending laterally to prevent rotation of the entire aiming/leveling bracket during manual rotation of the aiming nut.

14. The vehicular lighting fixture according to claim 1, wherein:

the recess is located at or substantially at a front end portion of the aiming/leveling bracket; and the aiming nut is located at or substantially at a rear end portion of the aiming/leveling bracket.

15. The vehicular lighting fixture according to claim 14, wherein:

the leveling mechanism is a vertical leveling mechanism is disposed above the lamp unit; and the aiming/leveling bracket is disposed between the leveling actuator and the lamp unit.

16. The vehicular lighting fixture according to claim 14, wherein the recess has a shape of one selected from the group consisting of a rectangle, a chamfered rectangle, an ellipse and a circle.

17. The vehicular lighting fixture according to claim 14, comprising rotation preventing portions formed beside the aiming nut and extending laterally to prevent rotation of the entire aiming/leveling bracket during manual rotation of the aiming nut.

18. The vehicular lighting fixture according to claim 1, wherein:

the leveling mechanism is a vertical leveling mechanism is disposed above the lamp unit; and the aiming/leveling bracket is disposed between the leveling actuator and the lamp unit.

19. The vehicular lighting fixture according to claim 1, wherein the recess has a shape of one selected from the group consisting of a rectangle, a chamfered rectangle, an ellipse and a circle.

20. The vehicular lighting fixture according to claim 1, comprising rotation preventing portions formed beside the aiming nut and extending laterally to prevent rotation of the entire aiming/leveling bracket during manual rotation of the aiming nut.

* * * * *